(12) United States Patent
Zhou et al.

(10) Patent No.: US 12,717,024 B2
(45) Date of Patent: Aug. 25, 2026

(54) IMAGING METHOD AND APPARATUS

(71) Applicant: Huawei Technologies Co., Ltd., Shenzhen (CN)

(72) Inventors: Zhi Zhou, Chengdu (CN); Kun Zeng, Chengdu (CN)

(73) Assignee: Huawei Technologies Co., Ltd., Shenzhen (CN)

(*) Notice: Subject to any disclaimer, the term of this patent is extended or adjusted under 35 U.S.C. 154(b) by 375 days.

(21) Appl. No.: 18/486,598

(22) Filed: Oct. 13, 2023

(65) Prior Publication Data

US 2024/0045055 A1 Feb. 8, 2024

Related U.S. Application Data

(63) Continuation of application No. PCT/CN2022/085100, filed on Apr. 2, 2022.

(30) Foreign Application Priority Data

Apr. 15, 2021 (CN) ........................ 202110407667.3

(51) Int. Cl.
*G01S 13/89* (2006.01)
*G01S 7/4914* (2020.01)

(52) U.S. Cl.
CPC ............ *G01S 13/89* (2013.01); *G01S 7/4914* (2013.01)

(58) Field of Classification Search
CPC ........ G01S 13/343; G01S 13/89; G01S 13/90; G01S 7/4914
See application file for complete search history.

(56) References Cited

U.S. PATENT DOCUMENTS

| | | | | |
|---|---|---|---|---|
| 6,965,340 B1 * | 11/2005 | Baharav | ............... | H01Q 21/065 342/195 |
| 11,754,668 B2 * | 9/2023 | Gao | ........................ | G01S 13/38 342/200 |
| 2006/0164287 A1 * | 7/2006 | Holt | ........................ | G01S 13/89 342/179 |
| 2008/0100500 A1 * | 5/2008 | Kondoh | ................ | G01S 7/0232 342/109 |
| 2014/0224021 A1 * | 8/2014 | Edwards | ................ | G01N 21/47 73/601 |

(Continued)

FOREIGN PATENT DOCUMENTS

| | | |
|---|---|---|
| CN | 102590806 A | 7/2012 |
| EP | 3432027 A1 | 1/2019 |

(Continued)

*Primary Examiner* — Peter M Bythrow
(74) *Attorney, Agent, or Firm* — Slater Matsil, LLP

(57) ABSTRACT

In accordance with an embodiment, an imaging method includes: transmitting a first signal at a first moment in time, and transmitting a second signal at a second moment in time, wherein the first moment in time is different from the second moment in time, and the first signal and the second signal are different in one or more of the following: a frequency, a transmission location, or a transmission direction; receiving a third signal and a fourth signal, wherein the third signal is a signal obtained by reflecting the first signal via a first object, and the fourth signal is a signal obtained by reflecting the second signal via the first object; and determining an image of the first object based on the third signal and the fourth signal.

20 Claims, 6 Drawing Sheets

(56) References Cited

U.S. PATENT DOCUMENTS

| | | | | |
|---|---|---|---|---|
| 2014/0285375 | A1* | 9/2014 | Crain | G01S 17/86<br>342/25 A |
| 2015/0048253 | A1* | 2/2015 | Wu | G01S 13/887<br>250/393 |
| 2016/0116582 | A1* | 4/2016 | Chang | G01S 7/42<br>342/25 A |
| 2016/0216371 | A1* | 7/2016 | Ahmed | G01S 13/89 |
| 2018/0113206 | A1* | 4/2018 | Pokrass | G01S 13/003 |
| 2018/0149735 | A1* | 5/2018 | Lim | H01Q 21/0075 |
| 2020/0142046 | A1* | 5/2020 | Ouderkirk | G01S 7/415 |
| 2020/0233076 | A1* | 7/2020 | Chen | G01S 13/584 |
| 2020/0319331 | A1* | 10/2020 | Sheen | G01S 13/426 |
| 2020/0320731 | A1* | 10/2020 | Sheen | G06F 3/04815 |
| 2021/0173042 | A1* | 6/2021 | Wu | G01S 7/356 |
| 2021/0173069 | A1* | 6/2021 | Wu | G01S 13/343 |
| 2021/0239787 | A1* | 8/2021 | Li | G01S 13/343 |
| 2021/0341598 | A1* | 11/2021 | Sahara | G01S 13/931 |
| 2021/0405182 | A1* | 12/2021 | Reynolds | G01S 13/90 |
| 2022/0206133 | A1* | 6/2022 | Subburaj | H03C 3/0941 |

FOREIGN PATENT DOCUMENTS

| | | | |
|---|---|---|---|
| EP | 3465263 | B1 | 12/2021 |
| WO | 2015108644 | A1 | 7/2015 |

* cited by examiner

Area 1
Area 2
t1
t2
Area 4
Area 3
t4
t3

IMAGING METHOD AND APPARATUS

CROSS-REFERENCE TO RELATED APPLICATIONS

This application is a continuation of International Application No. PCT/CN2022/085100, filed on Apr. 2, 2022, which claims priority to Chinese Patent Application No. 202110407667.3, filed on Apr. 15, 2021. The disclosures of the aforementioned applications are hereby incorporated by reference in their entireties.

TECHNICAL FIELD

This application relates to the field of imaging technologies, and in particular, to an imaging method and apparatus.

BACKGROUND

Radar imaging technology is a kind of all-weather imaging technology, which is very important in the fields of autonomous driving, security screening, target recognition, and the like.

Aperture coding imaging technology is a mainstream imaging technology in the radar imaging technology. In the aperture coding imaging technology, a spatial-temporal orthogonal signal is transmitted, by using coding antennas, to a first area in which a first object is located, and a reflected or transparently transmitted signal of the signal is received by using a receiving antenna, to perform a coding antenna-based signal fusion operation based on the reflected or transparently transmitted signal, thereby determining imaging of the first object.

In the aperture coding imaging technology, on one hand, a signal correlation is related to imaging quality. For example, a lower signal correlation indicates better imaging quality, and better imaging quality indicates a lower signal correlation. On the other side, a signal quantity is related to imaging resolution. For example, a larger signal quantity indicates higher imaging resolution. However, as the signal quantity increases, it is increasingly difficult to ensure a low correlation of signals. Consequently, imaging quality is not ideal, and an imaging requirement in a high-resolution scenario cannot be met.

SUMMARY

Embodiments of this application provide an imaging method and apparatus, to implement high-quality imaging at high resolution.

According to a first aspect, an imaging method is provided. The imaging method includes: transmitting a first signal at a first moment, transmitting a second signal at a second moment, and determining imaging of a first object based on the received third signal and fourth signal. The first moment is different from the second moment, and the first signal and the second signal are different in one or more of the following: a frequency, a transmission location, or a transmission direction. The third signal is a signal obtained by using the first signal via the first object, and the fourth signal is a signal obtained by using the second signal via the first object.

It can be learned from the imaging method that, when there are a large quantity of signals, a correlation between transmitted signals may be reduced by changing one or more of a frequency, a transmission location, or a transmission direction of the signals, for example, a correlation between the first signal and the second signal is reduced, to correspondingly reduce correlation between received signals. In this way, a coding antenna-based signal fusion operation is performed based on a received signal, for example, the third signal and the fourth signal, to achieve high-quality imaging at high resolution.

In a possible design solution, the first signal may be a signal transmitted in a first area of an antenna array, and the second signal may be a signal transmitted in a second area of the antenna array. The first area is different from the second area. No signal is transmitted in the second area at the first moment, and no signal is transmitted in the first area at the second moment. It should be understood that, on one side, the first signal and the second signal are signals transmitted in different areas. In this way, a correlation between the first signal and the second signal may be reduced, thereby improving imaging quality to implement imaging with a large synthetic antenna aperture. On the other side, because the antenna array transmits a signal in only a part of an area each time, a relatively small-scale antenna array may be disposed, to reduce control complexity and control difficulty, thereby improving imaging efficiency and reducing costs.

In another possible design solution, the first signal may be a signal transmitted when the antenna array is located at a first location, and the second signal may be a signal transmitted when the antenna array is located at a second location. The first location is different from the second location. In this case, a location of the antenna array is adjusted, to increase a difference between signals and decrease a correlation between the signals. In this way, imaging effect is improved to implement imaging with a large synthetic antenna aperture.

In still another possible design solution, the first signal may be a signal transmitted when the antenna array is in a first posture, and the second signal may be a signal transmitted when the antenna array is in a second posture. The first posture and the second posture may be different. In this case, the posture of the antenna array is adjusted, to increase a difference between signals and reduce a correlation between the signals. In this way, imaging effect is improved to implement imaging with a large synthetic antenna aperture.

In still another possible design solution, a frequency difference between the first signal and the second signal may be greater than a first frequency conversion threshold, and the frequency difference between the first signal and the second signal may also be less than a second frequency conversion threshold. The first frequency conversion threshold is less than the second frequency conversion threshold. In this way, a case in which a coding antenna-based signal fusion operation cannot be performed due to an excessively large frequency difference can be avoided, and a case in which a signal correlation is excessively high due to an excessively small frequency difference can be avoided, thereby ensuring imaging quality and imaging stability.

Optionally, a frequency of the first signal corresponds to a phase and/or an amplitude of the first signal, and a frequency of the second signal corresponds to a phase and/or an amplitude of the second signal. It should be understood that, because a correlation between the phase and/or the amplitude of the first signal and the phase and/or the amplitude of the second signal is low, a low correlation requirement between the frequency of the first signal and the frequency of the second signal can be ensured based on the foregoing correspondence, to further improve imaging effect.

Optionally, the second moment may be after the first moment, and the phase and/or the amplitude of the second signal may be determined based on a frequency, the phase, and the amplitude of the first signal. It should be understood that, when the phase and/or the amplitude of the second signal is determined, the frequency, the phase, and the amplitude of the first signal may be considered, to ensure a low correlation requirement between the phase and/or the amplitude of the first signal and the phase and/or the amplitude of the second signal, to further improve imaging effect.

According to a second aspect, an imaging apparatus is provided. The imaging apparatus includes a transceiver module and a processing module. The transceiver module is configured to: transmit a first signal at a first moment, transmit a second signal at a second moment, and receive a third signal and a fourth signal. The processing module is configured to determine imaging of the first object based on the third signal and the fourth signal. The first moment is different from the second moment. The first signal and the second signal are different in one or more of the following: a frequency, a transmission location, or a transmission direction. The third signal is a signal obtained by using the first signal via the first object. The fourth signal is a signal obtained by using the second signal via the first object.

In a possible design solution, the first signal may be a signal transmitted in a first area of an antenna array. The second signal may be a signal transmitted in a second area of the antenna array. The first area may be different from the second area. No signal is transmitted in the second area at the first moment, and no signal is transmitted in the first area at the second moment.

In another possible design solution, the first signal may be a signal transmitted when the antenna array is located at a first location. The second signal may be a signal transmitted when the antenna array is located at a second location. The first location may be different from the second location.

In still another possible design solution, the first signal may be a signal transmitted when the antenna array is in a first posture. The second signal may be a signal transmitted when the antenna array is in a second posture. The first posture and the second posture may be different.

In still another possible design solution, a frequency difference between the first signal and the second signal may be greater than a first frequency conversion threshold, and the frequency difference between the first signal and the second signal may also be less than a second frequency conversion threshold. The first frequency conversion threshold may be less than the second frequency conversion threshold.

Optionally, a frequency of the first signal corresponds to a phase and/or an amplitude of the first signal. A frequency of the second signal corresponds to a phase and/or an amplitude of the second signal.

Optionally, the second moment may be after the first moment. The phase and/or the amplitude of the second signal may be determined based on a frequency, the phase, and the amplitude of the first signal.

Optionally, the transmitting module and the receiving module may also be integrated into one module, for example, a transceiver module. The transceiver module is configured to implement a transmitting function and a receiving function of the apparatus according to the second aspect.

Optionally, the apparatus according to the second aspect may further include a storage module, and the storage module stores a program or instructions. When the processing module executes the program or the instructions, the apparatus performs the method according to the first aspect.

It should be noted that the apparatus according to the second aspect may be a terminal device, or may be a chip (system) or another component or assembly that may be disposed in a terminal device, or may be an apparatus including a terminal device. This is not limited in this application.

In addition, for a technical effect of the apparatus according to the second aspect, refer to a technical effect of the method according to the first aspect. Details are not described herein again.

According to a third aspect, an imaging apparatus is provided. The apparatus includes a processor. The processor is coupled to a memory. The processor is configured to execute a computer program stored in the memory, so that the apparatus performs the method according to the first aspect.

Optionally, the apparatus according to the third aspect may further include a receiver and a transmitter. The receiver is configured to implement a receiving function of the apparatus, and the transmitter is configured to implement a transmitting function of the apparatus. It should be understood that the transmitter and the receiver may also be integrated into one component, for example, a transceiver. The transceiver is configured to implement the transmitting function and the receiving function of the apparatus.

It should be noted that the apparatus according to the third aspect may be a terminal device, or may be a chip (system) or another component or assembly that may be disposed in a terminal device, or may be an apparatus including a terminal device. This is not limited in this application.

In addition, for a technical effect of the apparatus according to the third aspect, refer to a technical effect of the method according to the first aspect. Details are not described herein again.

According to a fourth aspect, an imaging apparatus is provided. The apparatus includes a processor and a memory. The memory is configured to store a computer program, and when the processor executes the computer program, the apparatus performs the method according to the first aspect.

Optionally, the apparatus according to the fourth aspect may further include a receiver and a transmitter. The receiver is configured to implement a receiving function of the apparatus, and the transmitter is configured to implement a transmitting function of the apparatus. Optionally, the transmitter and the receiver may also be integrated into one component, for example, a transceiver. The transceiver is configured to implement the transmitting function and the receiving function of the apparatus.

In this application, the apparatus according to the fourth aspect may be a terminal device, or may be a chip (system) or another component or assembly that may be disposed in a terminal device, or may be an apparatus including a terminal device. This is not limited in this application.

In addition, for a technical effect of the apparatus according to the fourth aspect, refer to a technical effect of the method according to the first aspect. Details are not described herein again.

According to a fifth aspect, an imaging apparatus is provided. The apparatus includes a processor and an interface circuit. The interface circuit is configured to receive code instructions and transmit the code instructions to the processor; and the processor is configured to run the code instructions to perform the method according to the first aspect.

Optionally, the apparatus according to the fifth aspect may further include a receiver and a transmitter. The receiver is configured to implement a receiving function of the apparatus, and the transmitter is configured to implement a transmitting function of the apparatus. Optionally, the transmitter and the receiver may also be integrated into one component, for example, a transceiver. The transceiver is configured to implement the transmitting function and the receiving function of the apparatus.

Optionally, the apparatus according to the fifth aspect may further include a memory, and the memory stores a program or instructions. When the processor according to the fifth aspect executes the program or the instructions, the apparatus is enabled to perform the method according to the first aspect.

It should be noted that the apparatus according to the fifth aspect may be a terminal device, or may be a chip (system) or another component or assembly that may be disposed in a terminal device, or may be an apparatus including a terminal device. This is not limited in this application.

In addition, for a technical effect of the apparatus according to the fifth aspect, refer to a technical effect of the method according to the first aspect. Details are not described herein again.

According to a sixth aspect, an imaging apparatus is provided. The apparatus includes a processor and a transceiver. The transceiver may be a transceiver circuit or an interface circuit. The transceiver is configured to exchange information between the apparatus and another apparatus. The processor executes program instructions to perform the method according to the first aspect.

Optionally, the apparatus according to the sixth aspect may further include a memory, and the memory stores a program or instructions. When the processor according to the sixth aspect executes the program or the instructions, the apparatus performs the method according to the first aspect.

It should be noted that the apparatus according to the sixth aspect may be a terminal device, or may be a chip (system) or another component or assembly that may be disposed in a terminal device, or may be an apparatus including a terminal device. This is not limited in this application.

In addition, for a technical effect of the apparatus according to the sixth aspect, refer to a technical effect of the method according to the first aspect. Details are not described herein again.

According to a seventh aspect, a computer-readable storage medium is provided. The computer-readable storage medium may include a computer program or instructions, and when the computer program or the instructions is/are run on a computer, the computer performs the method according to the first aspect.

According to an eighth aspect, a computer program product is provided. The computer program product may include a computer program or instructions. When the computer program or the instructions is/are run on a computer, the computer performs the method according to the first aspect.

DESCRIPTION OF EMBODIMENTS

Figure 1:
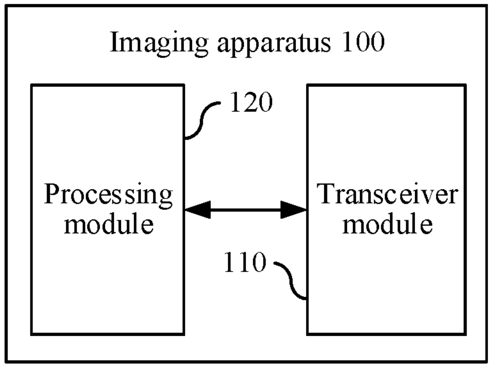
FIG. 1 is a schematic diagram 1 of a structure of an imaging apparatus according to an embodiment of this application.

First, technical terms in embodiments of this application are described.

1. Aperture Coding Imaging:

The aperture coding imaging is transmitting, by using an antenna array, a spatial-temporal orthogonal signal to an area in which a first object is located, and receiving a reflected or transparently transmitted signal of the signal, to determine imaging of the first object based on the reflected or transparently transmitted signal. The following uses a linearly frequency-modulated signal as an example for description.

Specifically, the linearly frequency-modulated signal may be represented as shown in the following formula (1):

$$S(t)=rect(t/T_p)*A*\exp\left[j2\pi\left(f_c t+0.5\gamma t^2\right)\right]; \quad (1)$$

t is a transmission moment of the linearly frequency-modulated signal, $T_p$ may be a pulse width of the linearly frequency-modulated signal, A may be an amplitude of the linearly frequency-modulated signal, $f_c$ may be a center frequency of the linearly frequency-modulated signal, $\gamma$ may be a frequency modulation slope of the linearly frequency-modulated signal, and rect(.) may be a rectangular window function.

If an antenna array has I oscillators (units), I is an integer greater than 1, and each unit may transmit a corresponding linearly frequency-modulated signal to the foregoing area, the I linearly frequency-modulated signals may be represented as shown in the following formula (2):

$$S_c(t)=\sum_{i=1}^{I} rect(t/T_p)*A_{t,i}*\exp(j\psi_{t,i})*\exp\left[j2\pi\left(f_c t+0.5\gamma t^2\right)\right]; \quad (2)$$

$A_{t,i}$ may be an amplitude of an $i^{th}$ linearly frequency-modulated signal, $\psi_{t,i}$ may be a phase of the $i^{th}$ linearly frequency-modulated signal, and i may range from 1 to I.

If the area includes K sub-areas, and K is an integer greater than 1, each linearly frequency-modulated signal may be reflected via the K sub-areas or transparently transmitted through the K sub-areas, to form K received signals, and a total of K*I received signals are formed. If the K*I received signals are considered as a group of received signals, the group of received signals may be represented by the following formula (3):

$$S_r(t)=\sum_{k=1}^{K}\sum_{i=1}^{K}\begin{matrix} rect\left((t-t_{i,k})/T_p\right)*A_{t,i}*\beta_k*\exp(j\psi_{t,i})* \\ \exp\left[j2\pi\left(f_c(t-t_{i,k})+0.5\gamma(t-t_{i,k})^2\right)\right]\end{matrix}; \quad (3)$$

k may range from 1 to K, $t_{i,k}$ is a moment at which an $(i, k)^{th}$ received signal is received, the $(i, k)^{th}$ received signal may be a signal formed by reflecting an $i^{th}$ linearly frequency-modulated signal via a $k^{th}$ sub-area or projecting an $i^{th}$ linearly frequency-modulated signal through a $k^{th}$ sub-area, and $\beta_k$ may be a scattering coefficient of the $k^{th}$ sub-area.

Further, because a linear relationship shown in the following formula (4) exists between a received signal and a scattering coefficient, N groups of received signals corresponding to N times of transmission may be represented by the following formula (5) and formula (6):

$$S_r=S*\beta+\omega; \quad (4)$$

$$\begin{bmatrix} S_r(t_1) \\ S_r(t_2) \\ \vdots \\ S_r(t_N) \end{bmatrix}=\begin{bmatrix} S(t_1,1) & S(t_1,2) & \dots & S(t_1,K) \\ S(t_2,1) & S(t_2,2) & \dots & S(t_2,K) \\ \vdots & \vdots & \ddots & \vdots \\ S(t_N,1) & S(t_N,2) & \dots & S(t_N,K) \end{bmatrix}*\begin{bmatrix} \beta_1 \\ \beta_2 \\ \vdots \\ \beta_K \end{bmatrix}+\omega; \quad (5)$$

$$S(t_n,k)=\sum_{i=1}^{I}\begin{matrix} rect\left((t-t_{i,k})/T_p\right)*A_{t,i}*\exp(j\psi_{t,i})* \\ \exp\left[j2\pi\left(f_c(t-t_{i,k})+0.5\gamma(t-t_{i,k})^2\right)\right]\end{matrix}; \quad (6)$$

N is an integer greater than 1, ω is noise, n may range from 1 to N, S is a time domain reference signal matrix, and $S(t_n,k)$ is an $(n, k)^{th}$ element in the time domain reference signal matrix. In this way, a scattering coefficient of each sub-area may be determined by solving the foregoing formula (5) and formula (6) simultaneously, to determine the imaging of the first object based on the scattering coefficient of each sub-area.

2. Effective Rank:

The effective rank of the time domain reference signal matrix may indicate whether imaging effect is good or bad. For example, a larger effective rank of the time domain reference signal matrix indicates a lower correlation between rows and columns in the time domain reference signal matrix, and a better imaging effect. On the contrary, a smaller effective rank of the time domain reference signal matrix indicates a higher correlation between rows and columns in the time domain reference signal matrix, and a poorer imaging effect.

The effective rank may be a norm ratio of the time domain reference signal matrix to a rank matrix of the time domain reference signal matrix. A norm of the time domain reference signal matrix may be determined based on a singular value of the time domain reference signal matrix, and a norm of the rank matrix may be determined based on a singular value of the rank matrix.

For example, if singular value decomposition is performed on the time domain reference signal matrix, the time domain reference signal matrix may be represented by the following formula (7) and formula (8):

$$S=U\sum V^T; \quad (7)$$

$$\sum=diag(\sigma_1,\sigma_2,\ \dots\ \sigma_r); \quad (8)$$

U and V are unitary matrices obtained by decomposing the time domain reference signal matrix, $(\sigma_1, \sigma_2, \dots \sigma_r)$ is the singular value of the time domain reference signal matrix, and r is an integer greater than 1. In this way, the norm of the time domain reference signal matrix may be represented by the following formula (9):

$$F=\sqrt{\sigma_1^2+\sigma_2^2+\dots+\sigma_r^2}; \quad (9)$$

If singular value decomposition is performed on the rank matrix of the time domain reference signal matrix, the rank matrix may be represented by the following formula (10) and formula (11):

$$S'=U'\Sigma'S'^T; \quad (10)$$

$$\Sigma'=\mathrm{diag}(\sigma_1',\sigma_2',\dots\sigma_r'); \quad (11)$$

U' and V' are unitary matrices obtained by decomposing the rank matrix, $(\sigma_1', \sigma_2', \dots \sigma_r')$ is the singular value of the rank matrix. In this way, the norm of the rank matrix may be represented by the following formula (12):

$$F'=\sqrt{\sigma_1'^2+\sigma_2'^2+\dots+\sigma_r'^2}; \quad (12)$$

Further, it can be learned from the foregoing formula (9) and formula (12) that the effective rank of the time domain reference signal matrix may be represented by the following formula (13):

$$v=\frac{F}{F'}=\frac{\sqrt{\sigma_1^2+\sigma_2^2+\dots+\sigma_r^2}}{\sqrt{\sigma_1'^2+\sigma_2'^2+\dots+\sigma_r'^2}}; \quad (13)$$

v is an effective rank of the time domain reference signal matrix. In this way, if v is larger, for example, closer to 1, imaging effect is better. On the contrary, if v is smaller, for example, closer to 0, imaging effect is poorer.

The following describes technical solutions of this application with reference to the accompanying drawings.

All aspects, embodiments, or features are presented in this application by describing a system that may include a plurality of devices, components, modules, and the like. It should be appreciated and understood that, each system may include another device, component, module, and the like, and/or may not include all devices, components, modules, and the like discussed with reference to the accompanying drawings. In addition, a combination of these solutions may be used.

In addition, in embodiments of this application, words such as "example" and "for example" are used to represent giving an example, an illustration, or a description. Any embodiment or design solution described as an "example" in this application should not be explained as being more preferred or having more advantages than another embodiment or design solution. Exactly, the use of the word "example" is intended to present the concept in a specific manner.

In embodiments of this application, "information", "signal", "message", "channel", and "signaling" may be used together sometimes. It should be noted that, when a difference these terms is not emphasized, meanings to be expressed are consistent. Terms "of" and "corresponding (relevant)" may be interchangeably used sometimes. It should be noted that meanings expressed by the terms are consistent when differences of the terms are not emphasized.

In embodiments of this application, sometimes a subscript in, for example, $W_1$ may be written in an incorrect form such as $W_1$. Expressed meanings are consistent when differences are not emphasized.

A network architecture and a service scenario described in embodiments of this application are intended to describe the technical solutions in embodiments of this application more clearly, but constitute no limitation on the technical solutions provided in embodiments of this application. A person of ordinary skill in the art may learn that the technical solutions provided in embodiments of this application are also applicable to a similar technical problem as the network architecture evolves and a new service scenario emerges.

For ease of understanding embodiments of this application, an imaging apparatus 100 shown in FIG. 1 is first used as an example to describe in detail an imaging apparatus 100 applicable to embodiments of this application.

The imaging apparatus 100 may be a terminal device, or may be a chip (system) or another component or assembly that may be disposed in the terminal device, or may be an apparatus including a terminal device. This is not limited in this application. The terminal device may be a terminal having a receiving/transmitting function, or may be disposed in a chip or a chip system of the terminal. The terminal device may also be referred to as a user apparatus, an access terminal, a subscriber unit, a subscriber station, a mobile station, a mobile console, a remote station, a remote terminal, a mobile device, a user terminal, a terminal, a wireless communication device, a user agent, or a user apparatus. The terminal device in embodiments of this application may be a mobile phone (mobile phone), a tablet computer (Pad), a computer with a wireless receiving/transmitting function, an in-vehicle terminal, an RSU with a terminal function, or the like. The terminal device in this application may alternatively be a vehicle-mounted module, a vehicle-mounted module, a vehicle-mounted component, a vehicle-mounted chip, a vehicle-mounted unit, or the like that is built in a vehicle as one or more components or units.

The imaging apparatus 100 may include a transceiver module no and a processing module 120. The transceiver module no is configured to: transmit a first signal at a first moment, transmit a second signal at a second moment, and receive a third signal and a fourth signal. The processing module 120 is configured to determine imaging of a first object based on the third signal and the fourth signal.

The first moment is different from the second moment. For example, the second moment may be after the first moment. This is not limited herein.

The first signal and the second signal may be any two groups of radar signals in a plurality of groups of radar signals. The plurality of groups of radar signals may be a plurality of groups of signals continuously transmitted by the transceiver module no to the area in which the first object is located. In other words, there may be a plurality of first signals and a plurality of second signals, and the first signal and the second signal are different in one or more of the following: a frequency, a transmission location, or a transmission direction. The first object may be any object in an actual application scene, such as a pedestrian, a vehicle, a tree, a street lamp, a pole, or a building. This is not limited herein. For ease of understanding, with reference to FIG. 2 to FIG. 10, the following specifically describes how to implement different frequencies, transmission locations, or transmission directions by using an example in which the first signal is a first group of signals transmitted by the transceiver module 110 and the second signal is a second group of signals transmitted by the transceiver module 110.

Scenario A: The frequencies of the first signal and the second signal are different.

Figure 2:
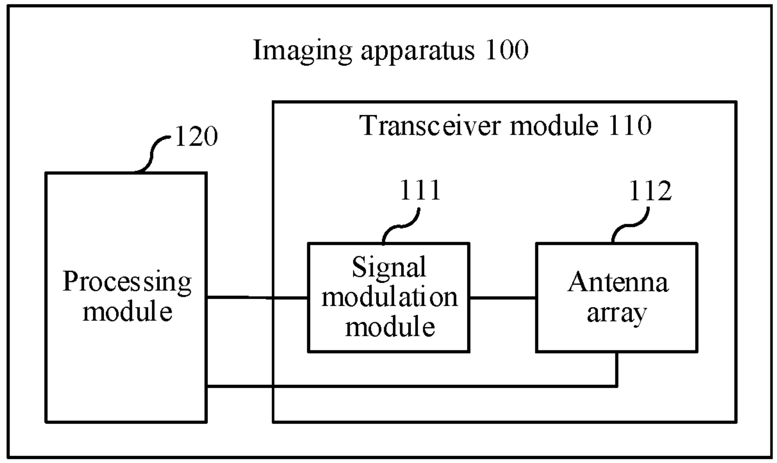
FIG. 2 is a schematic diagram 2 of a structure of an imaging apparatus according to an embodiment of this application.

FIG. 2 is a schematic diagram 2 of a structure of an imaging apparatus 100. As shown in FIG. 2, the transceiver module 110 may include a signal modulation module 111 and an antenna array 112. The processing module 120 may be connected to the signal modulation module 111, and the signal modulation module 111 may be coupled to the antenna array 112. In this way, the processing module 120 may control the signal modulation module 111 to modulate a reference signal, to generate the first signal and the second signal that have different frequencies. In this case, the first signal and the second signal are sequentially transmitted by using the antenna array 112.

Specifically, the processing module 120 may preconfigure a first parameter. The first parameter may be used for signal modulation, and may include one or more of the following: a frequency range, a frequency step size, an amplitude variation, and a phase variation.

The frequency range is related to a center frequency of a reference signal. For example, a deviation between a lower frequency limit of the frequency range and a center frequency may be less than a down-conversion threshold, and a deviation between an upper frequency limit of the frequency range and the center frequency may be less than an up-conversion threshold. Both the down-conversion threshold and the up-conversion threshold may be related to the center frequency, for example, may be $1/20$ to $1/10$ of the center frequency. In this way, impact that is on a subsequent imaging effect and that is caused by an excessively large frequency conversion amplitude can be avoided, to ensure imaging stability and reliability.

The frequency step size may represent a minimum unit of frequency conversion, for example, may be 1 mega hertz (MHz), 2 MHz or 4 MHz, so that the signal modulation module 111 may perform frequency conversion modulation on the reference signal reliably in a unit of the frequency step size.

A quantity of amplitude variations may correspond to a quantity of first signals, for example, may be multiple, and values of the amplitude variations may be different, to ensure that amplitudes of subsequently generated first signals may be different, thereby reducing a correlation between the first signals, increasing the effective rank, and improving imaging effect. Similarly, a quantity of phase variations may also correspond to the quantity of the first signals, for example, may be multiple, and values of the phase variations may also be different, to ensure that phases of subsequently generated first signals may be different, thereby reducing a correlation between the first signals, increasing the effective rank, and improving imaging effect, to implement imaging with a large synthetic antenna aperture.

Further, the processing module 120 may determine an amplitude variation and/or a phase variation of the first group of signals based on the first parameter. Then, the processing module 120 may determine a frequency variation of the first group of signals based on the amplitude variation and/or the phase variation of the first group of signals, for example, based on a correspondence between the amplitude variation and the frequency variation, and/or a correspondence between the phase variation and the frequency variation. In this way, the processing module 120 may send the frequency variation of the first group of signals and the amplitude variation and/or the phase variation of the first group of signals to the signal modulation module 111. It should be understood that, for a signal transmitted for the first time, the frequency variation may also be 0, that is, frequency conversion modulation may not be performed on the signal transmitted for the first time, but this is not limited.

Correspondingly, the signal modulation module 111 may preconfigure a second parameter. The second parameter may be used to generate a reference signal, and may include one or more of the following: a waveform, a center frequency, a phase, and an amplitude. In this way, the signal modulation module 111 may generate a reference signal based on the second parameter, and modulate a reference signal based on the frequency variation of the first group of signals and the amplitude variation and/or the phase variation of the first group of signals, to generate a group of first signals, so that each oscillator in the antenna array 112 can transmit a corresponding first signal.

Then, the processing module 120 may further determine an amplitude variation and/or a phase variation of the second group of signals based on the frequency, the phase, and the amplitude of the first signal and based on the frequency range and the frequency step size. For example, the processing module 120 may calculate the frequency, the phase, and the amplitude of the first signal based on a precoding sequence such as Hadamard coding, and calculate the frequency range and the frequency step size, to determine the amplitude variation and/or the phase variation of the second group of signals. Then, the processing module 120 may also determine a frequency variation of the second group of signals based on the amplitude variation and/or the phase variation of the second group of signals, and send the frequency variation of the second group of signals, and the amplitude variation and the phase variation of the second group of signals to the signal modulation module 111.

Correspondingly, the signal modulation module 111 may modulate the reference signal based on the frequency variation of the second group of signals and the amplitude variation and/or the phase variation of the second group of signals, to generate a group of second signals, so that each oscillator in the antenna array 112 can transmit a corresponding second signal.

Then, the processing module 120 and the signal modulation module 111 may repeatedly perform the foregoing procedure until measurement ends.

It should be understood that a frequency difference between the first signal and the second signal may be greater than a first frequency conversion threshold and less than a second frequency conversion threshold. The first frequency conversion threshold is less than the second frequency conversion threshold. In this way, a case in which a coding antenna-based signal fusion operation cannot be performed due to an excessively large frequency difference can be avoided, and a case in which a correlation between the first signal and the second signal is excessively high due to an excessively small frequency difference can also be avoided, to ensure imaging quality and imaging stability.

It should be further understood that, on one hand, because the amplitude variation and the phase variation required for modulating the second signal may be determined based on the frequency, the phase, and the amplitude of the first signal, the phase and/or the amplitude of the second signal may be determined based on the frequency, the phase, and the amplitude of the first signal. In this way, a low correlation requirement between the phase and/or the amplitude of the first signal and the phase and/or the amplitude of the second signal can be ensured, so that the effective rank may be larger, to further improve imaging effect. On the other hand, because the correlation between the phase and/or the amplitude of the first signal and the phase and/or the amplitude of the second signal is low, a low correlation requirement between the frequency of the first signal and the frequency of the second signal may also be ensured based on the foregoing correspondence, to increase the effective rank, and further improve imaging effect, so as to implement imaging with a large synthetic antenna aperture.

Scenario B: The transmission locations of the first signal and the second signal are different.

That the transmission locations are different may be that areas of the antenna array 112 are different. For example, the first signal may be a signal transmitted in a first area of the antenna array 112, and the second signal may be a signal transmitted in a second area of the antenna array 112. The first area is different from the second area. For example, the first area and the second area may have different shapes and sizes, and the first area and the second area may be partially overlapping areas on the antenna array 112, or may be non-overlapping areas on the antenna array 112. No signal is transmitted in the second area at the first moment, and no signal is transmitted in the first area at the second moment. For example, if the first area and the second area partially overlap, that no signal is transmitted in the second area at the first moment may be: No signal is transmitted at the first moment in an area that does not overlap with the first area, and a signal is still transmitted at the first moment in an area that overlaps with the first area. That no signal is transmitted in the second area at the first moment may be: No signal is transmitted at the second moment in an area that does not overlap with the second area, and a signal is still transmitted at the second moment in an area that overlaps with the second area.

Alternatively, that the transmission locations are different may be that locations of the antenna array 112 are different. For example, the first signal may be a signal transmitted when the antenna array 112 is located at a first location. The second signal may be a signal transmitted when the antenna array 112 is located at a second location. The first location is different from the second location. The following separately describes that areas are different and that locations are different.

Figures 3, 4:
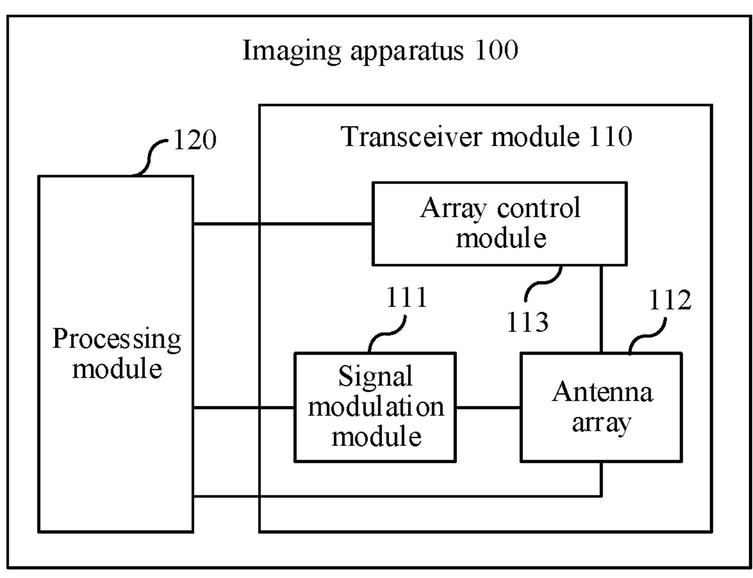
FIG. 3 is a schematic diagram 3 of a structure of an imaging apparatus according to an embodiment of this application.
FIG. 4 is a schematic diagram 1 of a structure of an antenna array in an imaging apparatus according to an embodiment of this application.

Scenario a, areas are different:

FIG. 3 is a schematic diagram 3 of a structure of an imaging apparatus 100. As shown in FIG. 3, a transceiver module no may include a signal modulation module 111, an array control module 113, and an antenna array 112. The processing module 120 may be connected to the signal modulation module 111 and the array control module 113, and the signal modulation module 111 and the array control module 113 may be coupled to the antenna array 112. In this way, the processing module 120 may control the signal modulation module 111 to modulate a reference signal, to generate a first signal and a second signal, and control a working status of each area of the antenna array 112 through the array control module 113, so that a first area of the antenna array 112 may transmit the first signal, and a second area may transmit the second signal.

Specifically, because the scenario a may not involve frequency conversion modulation, a difference from the foregoing scenario A lies in that a first parameter configured by the processing module 120 may not include a frequency range or a frequency step size. In this way, a processing device may send an amplitude variation and/or a phase variation of a first group of signals to the signal modulation module 111, and send a first control signal to the array control module 113, for example, send a control signal for switching an array working area.

On one hand, the array control module 113 may control, based on the first control signal, a working status of each area of the antenna array 112, for example, control the first area to be in a working state and the second area to be in a non-working state in a switch control or toggle control manner. The switch control means that the array control module 113 is connected to each area of the antenna array 112, to independently control enabling or disabling of each area. For example, the array control module 113 may control, based on the first control signal, the first area to be enabled, and control the second area to be disabled, so that the first area may be in a working state, and the second area may be in a non-working state. The toggle control means that the array control module 113 controls a working status of each area by switching a connection relationship with each area of the antenna array 112. For example, the array control module 113 may switch, based on the first control signal, from being connected to the second area to being connected to the first area, so that the first area may be in a working state, and the second area may be in a non-working state.

On the other hand, the signal modulation module 111 may generate a reference signal based on the second parameter, and modulate the reference signal based on the amplitude variation and/or the phase variation of the first group of signals, to generate a group of first signals. In this way, each oscillator in the first area may transmit a corresponding first signal, and no signal is transmitted in the second area.

Then, the processing module 120 may further determine an amplitude variation and/or a phase variation of the second group of signals based on the frequency, the phase, and the amplitude of the first signal and based on the frequency range and the frequency step size. In this way, the processing module 120 may send an amplitude variation and a phase variation of a second group of signals to the signal modulation module 111, and send a second control signal to the array control module 113, for example, send a control signal for switching an array working area.

On one hand, the array control module 113 may control, based on the second control signal, a working status of each area of the antenna array 112, for example, control the first area to be in a non-working state and the second area to be in a working state. The array control module 113 may also control the working status of each area of the antenna array 112 in a switch control or toggle control manner. Details are not described herein again. On the other hand, the signal modulation module 111 may also generate a reference signal based on the second parameter, and modulate the reference signal based on the amplitude variation and/or the phase variation of the second group of signals, to generate a group of second signals. In this way, each oscillator in the second area may transmit a corresponding first signal, and no signal is transmitted in the first area.

Then, the processing module 120, the signal modulation module 111, and the array control module 113 may repeatedly perform the foregoing procedure until measurement ends.

It should be understood that, on one hand, because the first signal and the second signal are signals transmitted in different areas, transmission locations of the first signal and the second signal are different. In this way, a correlation between the first signal and the second signal may be reduced, thereby improving imaging quality to implement imaging with a large synthetic antenna aperture. On the other side, because the antenna array 112 transmits a signal in only a part of an area each time, a relatively small-scale antenna array 112 may be disposed, to reduce control complexity and control difficulty, thereby improving imaging efficiency and reducing costs.

Figure 5:
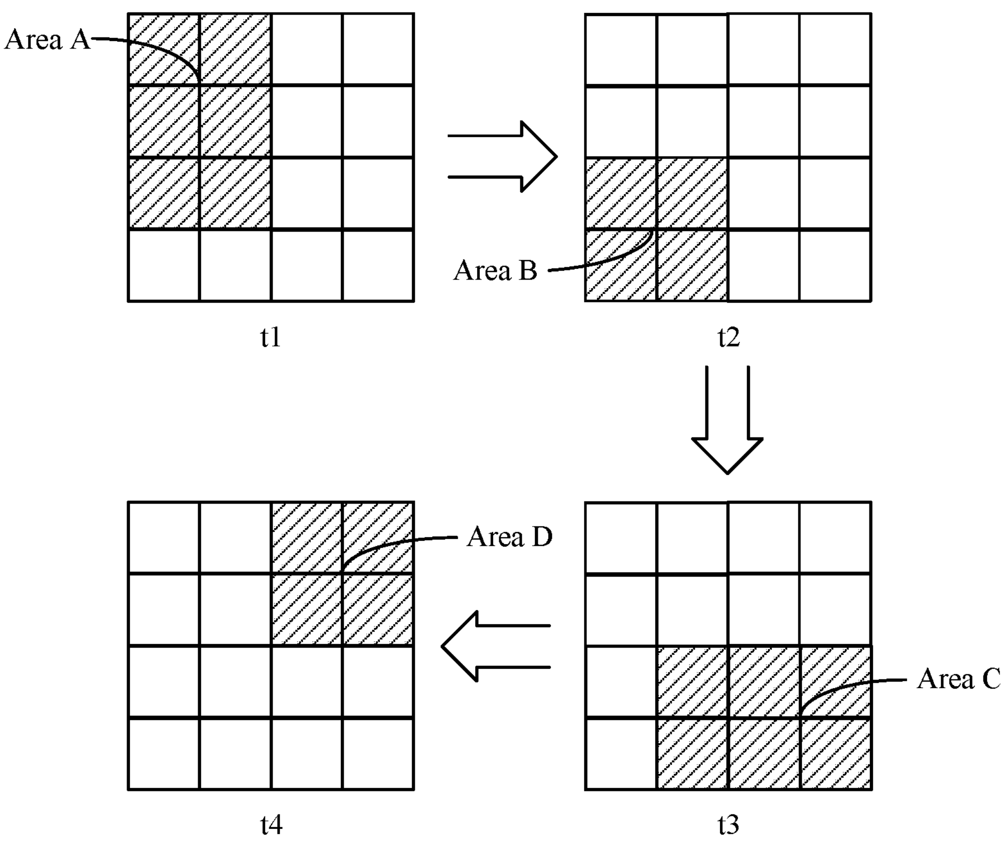
FIG. 5 is a schematic diagram 2 of a structure of an antenna array in an imaging apparatus according to an embodiment of this application.

For ease of understanding, the following uses two examples for description with reference to FIG. 4 and FIG. 5.

Example 1: FIG. 4 is a schematic diagram 1 of a structure of the antenna array 112. As shown in FIG. 4, at a moment t1, the array control module 113 may switch to be connected to an area 1 of the antenna array 112, to control four oscillators in the area 1 to separately transmit a signal 1. Then, at a moment t2, the array control module 113 may be switched to be connected to an area 2 (the area 2 and the area 1 do not overlap) of the antenna array 112, to control four oscillators in the area 2 to separately transmit a signal 2. In addition, at a moment t3, the array control module 113 may switch to be connected to an area 3 (the area 3 and the area 2 do not overlap) of the antenna array 112, to control four oscillators in the area 3 to separately transmit a signal 3. Finally, at a moment t4, the array control module 113 may switch to be connected to an area 4 (the area 4 and the area 3 do not overlap) of the antenna array 112, to control four oscillators in the area 4 to separately transmit a signal 4.

Example 2: FIG. 5 is a schematic diagram 2 of a structure of the antenna array 112. As shown in FIG. 5, at a moment t1, the array control module 113 may control an area A of the antenna array 112 to be enabled, and control an area outside the area A to be not enabled, to control six oscillators in the area A to separately transmit a signal 5. Then, at a moment t2, the array control module 113 may control an area B (the area B and the area A partially overlap) of the antenna array 112 to be enabled, and control an area outside the area B to be not enabled, to control four oscillators in the area B to separately transmit a signal 6. In addition, at a moment t3, the array control module 113 may control an area C (the area C and the area B partially overlap) of the antenna array 112 to be enabled, and control an area outside the area C to be not enabled, to control six oscillators in the area C to separately transmit a signal 7. Finally, at a moment t4, the array control module 113 may control an area D (the area D and the area C do not overlap) of the antenna array 112 to be enabled, and control an area outside the area D to be not enabled, to control four oscillators in the area D to separately transmit a signal 8.

Figure 6:
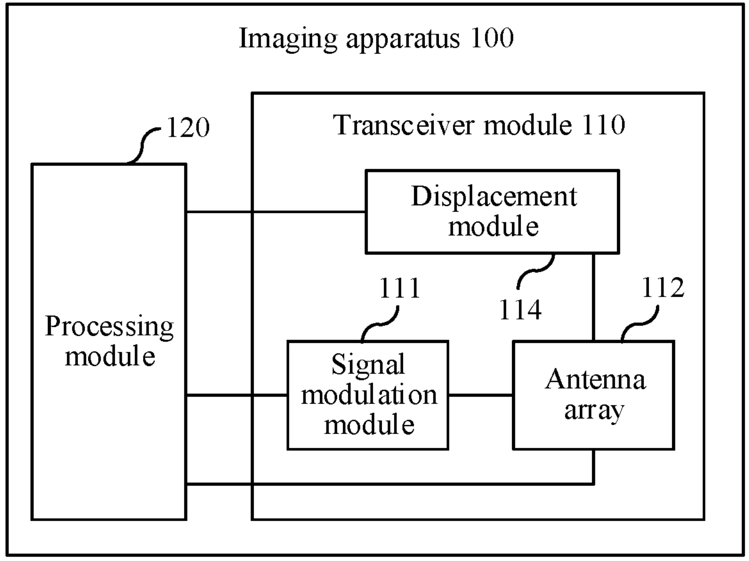
FIG. 6 is a schematic diagram 4 of a structure of an imaging apparatus according to an embodiment of this application.

Scenario b, locations are different:

FIG. 6 is a schematic diagram 4 of a structure of an imaging apparatus 100. As shown in FIG. 6, a transceiver module no may include a signal modulation module 111, a displacement module 114, and an antenna array 112. The processing module 120 may be connected to the signal modulation module 111 and the displacement module 114, the signal modulation module 111 may be coupled to the antenna array 112, and the displacement module 114 may be physically connected to the antenna array 112, for example, the antenna array 112 is installed on the displacement module 114. In this way, the processing module 120 may control the signal modulation module 111 to modulate a reference signal, to generate a first signal and a second signal, and control the displacement module 114 to move a location of the antenna array 112, so that the antenna array 112 may transmit the first signal at a first location and transmit the second signal at a second location.

Specifically, because the scenario b may not involve frequency conversion modulation, a difference from the foregoing scenario A lies in that a first parameter configured by the processing module 120 may alternatively not include a frequency range or a frequency step size. In this way, a processing device may also send an amplitude variation and/or a phase variation of a first group of signals to the signal modulation module 111. Because a location of the antenna array 112 may not need to be moved during a first transmission, the processing module 120 may not need to control the displacement module 114.

Correspondingly, the signal modulation module 111 may generate a reference signal based on the second parameter, and modulate the reference signal based on the amplitude variation and/or the phase variation of the first group of signals, to generate a group of first signals. In this way, the antenna array 112 may transmit the first signal at a first location.

Then, the processing module 120 may further determine an amplitude variation and/or a phase variation of the second group of signals based on the frequency, the phase, and the amplitude of the first signal and based on the frequency range and the frequency step size. In this way, the processing module 120 may send the amplitude variation and the phase variation of the second group of signals to the signal modulation module 111, and send a third control signal to the displacement module 114, for example, determine, based on a minimum correlation with reference signal vectors generated from the first group of signals and the second group of signals and a hardware condition constraint, a control signal based on a variation of the displacement module.

On one hand, the displacement module 114 may move the antenna array 112 from the first location to the second location based on the third control signal. On the other hand, the signal modulation module 111 may also generate a reference signal based on the second parameter, and modulate the reference signal based on the amplitude variation and/or the phase variation of the second group of signals, to generate a group of second signals. In this way, the antenna array 112 may transmit the second signal at the second location.

Then, the processing module 120, the signal modulation module 111, and the displacement module 114 may repeatedly perform the foregoing procedure until measurement ends.

It should be understood that, by adjusting a location of the antenna array 112, a difference between signals may be increased, and a correlation between reference signals may be reduced, so that the effective rank may be larger, thereby improving imaging effect, to implement imaging with a large synthetic antenna aperture.

Scenario C: transmission directions of the first signal and the second signal are different.

That the transmission directions are different may be implemented by adjusting a transmission direction of the antenna array 112, that is, adjusting a posture of the antenna array 112. For example, the first signal may be a signal transmitted when the antenna array 112 is in a first posture. The second signal may be a signal transmitted when the antenna array 112 is in a second posture. The first posture is different from the second posture. In this way, a difference between signals may be increased, and a correlation between signals may be reduced, to increase the effective rank, and further improve imaging effect, so as to implement imaging with a large synthetic antenna aperture.

In the scenario C, a rotating module (not shown in the figure) may be disposed to adjust a posture of the antenna array 112. For a specific control principle of the rotating module, refer to related descriptions of the displacement module 111 the foregoing "scenario b". Details are not described herein again.

Scenario D: the first signal and the second signal differ in at least two of the frequency, the transmission location, and the transmission direction:

For specific implementation of different frequencies of the first signal and the second signal, refer to related descriptions in the foregoing scenario A. For specific implementation of different transmission locations of the first signal and the second signal, refer to related descriptions in the foregoing scenario B. For specific implementation of different transmission directions of the first signal and the second signal, refer to related descriptions in the foregoing scenario C. Details are not described herein again.

It should be understood that, in scenario D, the frequency, the transmission location, and the transmission direction may be adjusted in a same transmission, or may be adjusted separately in each transmission. This is not limited.

Further, after the transceiver module 110 transmits the first signal and the second signal, the transceiver module 110 may receive a third signal at a third moment, and receive a fourth signal at a fourth moment. The third signal may be a signal obtained by using the first signal via the first object, for example, a signal reflected via the first object or transparently transmitted through the first object. The fourth signal is a signal obtained by using the second signal via the first object, for example, a signal reflected via the first object or transparently transmitted through the first object. In this way, the transceiver module 110 may determine a distance between the first object and the imaging apparatus 100 based on a time difference between the first moment and the third moment and/or based on a time difference between the second moment and the fourth moment, to divide an area in which the first object is located into a plurality of sub-areas, for example, into an imaging grid, within a threshold range near the distance, so that the processing module 120 may determine a scattering coefficient of each sub-area, for example, each grid in the imaging grid, based on the third signal and the fourth signal, thereby determining imaging of the first object. With reference to the foregoing scenarios A to D, the following specifically describes how to determine the imaging of the first object.

Scenario A:

If both the first signal and the second signal are linearly frequency-modulated signals, and a quantity of the plurality of sub-areas is K, with reference to related descriptions in the foregoing "1. Aperture coding imaging", the third signal and the fourth signal may be represented by the following formula (14), formula (15), and formula (16):

$$\begin{bmatrix} S_r^1(t_1) \\ S_r^2(t_2) \end{bmatrix} = \begin{bmatrix} S^1(t_1, 1) & S^1(t_1, 2) & \dots & S^1(t_1, K) \\ S^2(t_2, 1) & S^2(t_2, 2) & \dots & S^2(t_2, K) \end{bmatrix} * \begin{bmatrix} \beta_1 \\ \beta_2 \\ \vdots \\ \beta_K \end{bmatrix} + \omega; \tag{14}$$

-continued $$S_1(t_1, k) = \sum_{i=1}^{I} \frac{rect\left((t_1 - t_{i,k})/T_p^1\right) * A_{t,i} * \exp(j\psi_{t,i}) *}{\exp\left[j2\pi\left(f_c(t_1 - t_{i,k}) + 0.5\gamma(t_1 - t_{i,k})^2\right)\right]}; \tag{15}$$

$$S_2(t_2, k) = \sum_{m=1}^{M} \frac{rect\left((t_2 - t_{m,k})/T_p^2\right) * A_{t,m} * \exp(j\psi_{t,m}) *}{\exp\left[j2\pi\left(f_c(t_2 - t_{m,k}) + 0.5\gamma(t_2 - t_{m,k})^2\right) + f_1(t_2 - t_{m,k})\right]}; \tag{16}$$

I indicates that there are I first signals in total, I is an integer greater than 1, M indicates that there are M second signals in total, and M is an integer greater than 1.

$$S_r^1(t_1, k)$$

may be a group of third signals, and $$S_r^2(t_2, k)$$

may be a group of fourth signals. $S_1(t_1,k)$ is a $(1, k)^{th}$ element in a time domain reference signal matrix, and $S_2(t_2, k)$ is a $(2, k)^{th}$ element in the time domain reference signal matrix. $t_1$ is a first moment, and $t_2$ is a second moment. $t_{i,k}$ is a moment at which a $(i, k)^{th}$ third signal is received, the $(i, k)^{th}$ third signals is a signal formed after an $i^{th}$ first signal is reflected via a $k^{th}$ sub-area or projected through a $k^{th}$ sub-area, and i may range from 1 to I. $t_{m,k}$ is a moment at which a $(m, k)^{th}$ fourth signal is received, the $(m, k)^{th}$ fourth signal is a signal formed by reflecting an $m^{th}$ second signal via the $k^{th}$ sub-area or projecting an $m^{th}$ second signal through the $k^{th}$ sub-area, and m may range from 1 to M. $A_{t,i}$ is an amplitude of the $i^{th}$ first signal, and $A_{t,m}$ is an amplitude of an $i^{th}$ second signal.

$$T_p^1$$

may be a pulse width of the first signal, and $$T_p^2$$

may be a pulse width of the second signal. $\psi_{t,i}$ may be a phase of the $i^{th}$ first signal, and $\psi_{t,m}$ may be a phase of the $m^{th}$ second signal. $f_1$ may be a frequency variation.

In this way, a scattering coefficient of each sub-area may be determined by solving the foregoing formula (14) to formula (16) simultaneously, to determine the imaging of the first object based on the scattering coefficient of each sub-area.

Scenario B:

If both the first signal and the second signal are linearly frequency-modulated signals, and a quantity of the plurality of sub-areas is K, with reference to related descriptions in the foregoing "1. Aperture coding imaging", the third signal and the fourth signal may be represented by the following formula (14), formula (15), and the following formula (17):

$$S_2(t_2, k) = \sum_{m=1}^{M} \frac{rect\left((t_2 - t_{m,k})/T_p^2\right) * A_{t,m} * \exp(j\psi_{t,m}) *}{\exp\left[j2\pi\left(f_c(t_2 - t_{m,k}) + 0.5\gamma(t_2 - t_{m,k})^2\right)\right]} \tag{17}$$

In this way, a scattering coefficient of each sub-area may be determined by solving the foregoing formula (14), formula (15), and formula (17) simultaneously, to determine the imaging of the first object.

Scenario C:

If both the first signal and the second signal are linearly frequency-modulated signals, and a quantity of the plurality of subareas is K, for specific implementation of determining imaging in the scenario C, refer to related descriptions of determining imaging in the scenario B. Details are not described herein again.

Scenario D:

If both the first signal and the second signal are linearly frequency-modulated signals, and a quantity of the plurality of subareas is also K, for specific implementation of determining imaging in the scenario D, refer to related descriptions of determining imaging in the scenarios A to C. Details are not described herein again.

Figure 7:
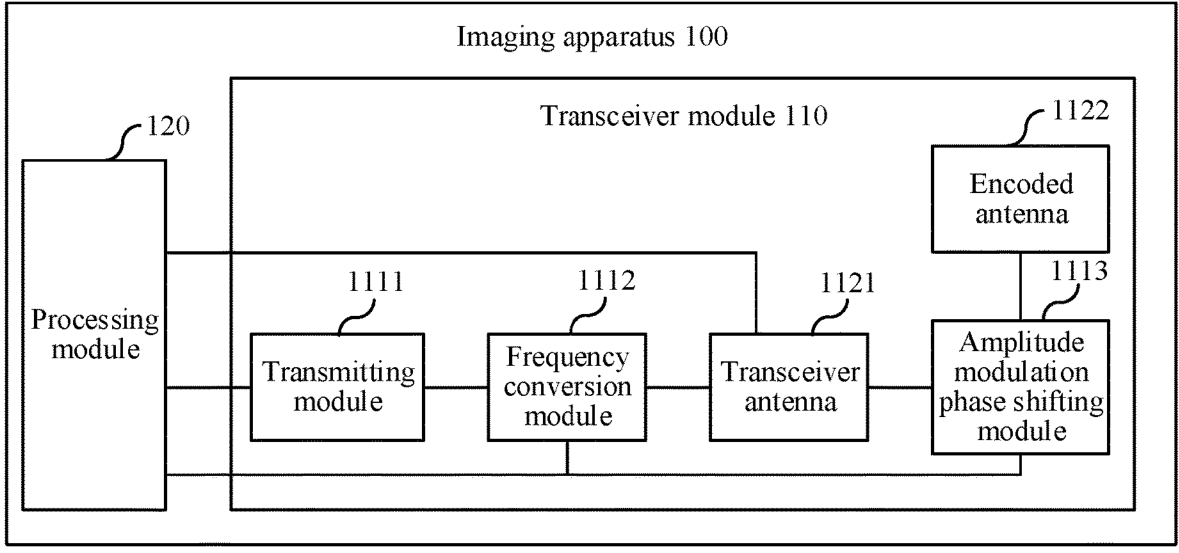
FIG. 7 is a schematic diagram 5 of a structure of an imaging apparatus according to an embodiment of this application.
Figure 8:
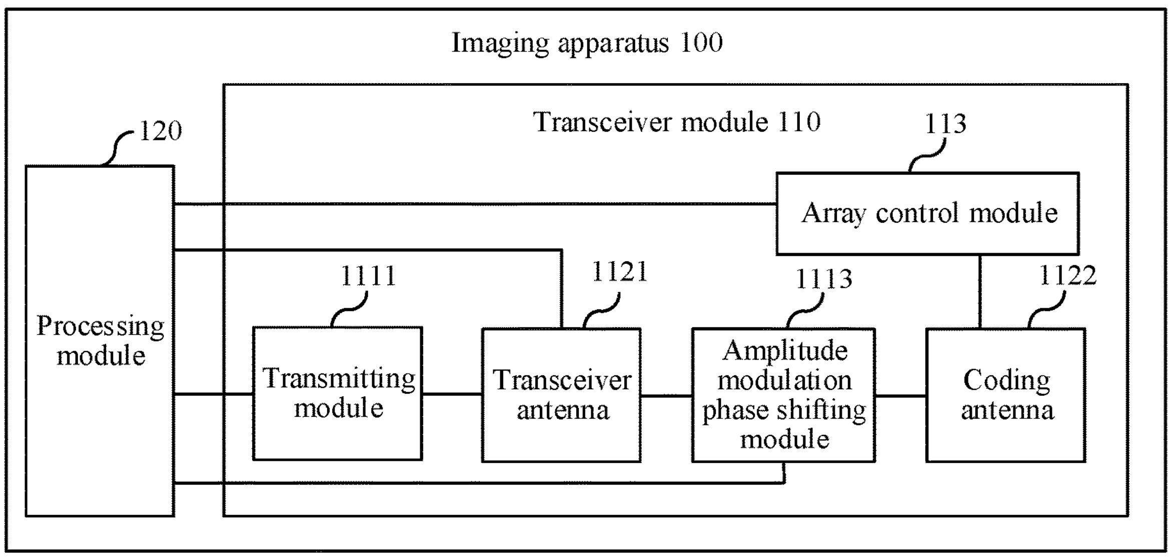
FIG. 8 is a schematic diagram 6 of a structure of an imaging apparatus according to an embodiment of this application.
Figure 9:
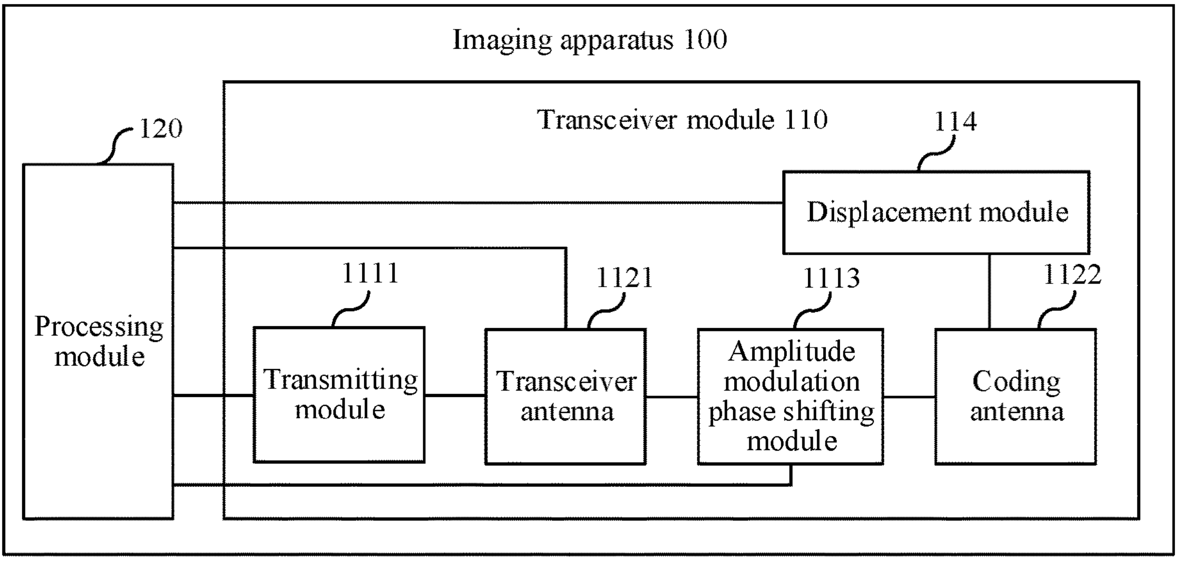
FIG. 9 is a schematic diagram 7 of a structure of an imaging apparatus according to an embodiment of this application.

Optionally, in a first implementation scenario of embodiments shown in FIG. 1 to FIG. 6, as shown in FIG. 7 to FIG. 9, the antenna array 112 may include a transceiver antenna 1121 and a coding antenna 1122. The coding antenna 1122 may also be referred to as an encoding aperture, and may include a plurality of oscillators. It should be understood that, in the foregoing scenarios A to D, connection relationships between the foregoing modules and the transceiver antenna 1121 and the coding antenna 1122 and working procedures of the foregoing modules are also different. The following are respectively introduced.

Scenario A:

FIG. 7 is a schematic diagram 5 of a structure of an imaging apparatus 100. As shown in FIG. 7, the signal modulation module 111 may include a transmitting module 1111, a frequency conversion module 1112, and an amplitude modulation phase shifting module 1113. A processing module 120 may be connected to the transmitting module 1111, the transmitting module 1111 may be connected to the frequency conversion module 1112, the frequency conversion module 1112 may be coupled to a transceiver antenna 1121, the transceiver antenna 1121 may be coupled to the amplitude modulation phase shifting module 1113, and the amplitude modulation phase shifting module 1113 may be coupled to a coding antenna 1122.

Specifically, the transmitting module 1111 may generate a reference signal based on the second parameter. The frequency conversion module 1112 may convert the reference signal into a first frequency conversion signal based on a frequency variation of the first group of signals, so that the transceiver antenna 1121 transmits the first frequency conversion signal. In this way, the amplitude modulation phase shifting module 1113 may perform a plurality of times of amplitude modulation and phase shifting operations on the first frequency conversion signal based on the amplitude variation and/or the phase variation of the first group of signals, to generate a group of first signals, so that each oscillator of the coding antenna 1122 may correspondingly transmit one first signal.

Then, the transmitting module 1111 may continue to generate a reference signal based on the second parameter. The frequency conversion module 1112 may convert the reference signal into a second frequency conversion signal based on the frequency variation of the second group of signals, so that the transceiver antenna 1121 transmits the second frequency conversion signal. In this way, the amplitude modulation phase shifting module 1113 may perform a plurality of times of amplitude modulation and phase shifting operations on the second frequency conversion signal based on the amplitude variation and/or the phase variation of the second group of signals, to generate a group of second signals, so that each oscillator of the coding antenna 1122 may correspondingly transmit one second signal.

Finally, the transceiver antenna 1121 may receive a third signal and a fourth signal, so that the processing module 120 may determine the imaging of the first object based on the third signal and the fourth signal.

Scenario B:

The scenario B may include two scenarios: a scenario a with different areas and a scenario b with different locations. The following separately describes the two scenarios.

FIG. 8 is a schematic diagram 6 of a structure of an imaging apparatus boo. As shown in FIG. 8, in the scenario a, a signal modulation module 111 may include a transmitting module 1111 and an amplitude modulation phase shifting module 1113. A processing module 120 may be connected to the transmitting module 1111, the transmitting module 1111 may be coupled to a transceiver antenna 1121, the transceiver antenna 1121 may be coupled to the amplitude modulation phase shifting module 1113, and the amplitude modulation phase shifting module 1113 and an array control module 113 may be coupled to the coding antenna 1122.

Specifically, the transmitting module 1111 may generate the reference signal based on the second parameter, so that the transceiver antenna 1121 transmits the reference signal. On one hand, the amplitude modulation phase shifting module 1113 may separately perform a plurality of times of amplitude modulation and phase shifting operations on the reference signal based on the amplitude variation and/or the phase variation of the first group of signals, to generate a group of first signals. On the other hand, the array control module 113 may control a first area of the coding antenna 1122 to be in a working state, and control a second area of the coding antenna 1122 to be in a non-working state. In this way, each oscillator in the first area may transmit a corresponding first signal.

Then, the transmitting module 1111 may continue to generate the reference signal based on the second parameter, so that the transceiver antenna 1121 transmits the reference signal. On one hand, the amplitude modulation phase shifting module 1113 may separately perform a plurality of times of amplitude modulation and phase shifting operations on the reference signal based on the amplitude variation and/or the phase variation of the second group of signals, to generate a group of second signals. On the other hand, the array control module 113 may control a first area of the coding antenna 1122 to be in a non-working state, and control a second area of the coding antenna 1122 to be in a working state. In this way, each oscillator in the second area may transmit a corresponding second signal.

Finally, the transceiver antenna 1121 may receive a third signal and a fourth signal, so that the processing module 120 may determine the imaging of the first object based on the third signal and the fourth signal. FIG. 9 is a schematic diagram 6 of a structure of an imaging apparatus 100. As shown in FIG. 9, in the scenario b, the signal modulation module 111 may include a transmitting module 1111 and an amplitude modulation phase shifting module 1113. A processing module 120 may be connected to the transmitting module 1111, the transmitting module 1111 may be coupled to a transceiver antenna 1121, the transceiver antenna 1121 may be coupled to the amplitude modulation phase shifting module 1113, and the amplitude modulation phase shifting module 1113 and the displacement module 114 may be coupled to the coding antenna 1122.

For specific implementations of the transmitting module 1111 and the amplitude modulation phase shifting module 1113 in the scenario b, refer to related descriptions in the foregoing scenario a. Details are not described herein again. However, a difference lies in that the displacement module 114 may control the coding antenna 1122 to be at a first location and/or in a first posture. In this way, the coding antenna 1122 may transmit a group of first signals at the first location and/or in the first posture. Afterwards, the displacement module 114 may control the coding antenna 1122 to move to a second location and/or to be adjusted to be in a second posture, so that the coding antenna 1122 may send a group of second signals at the second location and/or in the second posture. In this way, the transceiver antenna 1121 may receive a third signal and a fourth signal, so that the processing module 120 may determine the imaging of the first object based on the third signal and the fourth signal.

Scenario C:

For specific implementation of determining imaging in the scenario C, refer to related descriptions of determining imaging in the scenario B. Details are not described herein again.

Scenario D:

For specific implementation of determining imaging in the scenario D, refer to related descriptions of determining imaging in the scenarios A to C. Details are not described herein again.

It should be understood that the foregoing implementation of the antenna array 112 is merely an example, and is not limited. For example, the transceiver antenna 1121 may further include a transmitting antenna and a receiving antenna (not shown in the figure). The transmitting antenna may be configured to transmit a reference signal or a frequency conversion signal, and the receiving antenna may be configured to receive a third signal and a fourth signal. In addition, if signals are received and transmitted at different time, the receiving antenna and the transmitting antenna may alternatively be a same antenna.

Optionally, the imaging apparatus 100 may further include a storage module (not shown in the figure), and the storage module stores a program or instructions. When the processing module 120 executes the program or the instructions, the imaging apparatus 100 may perform the foregoing imaging procedure, to determine imaging of the first object.

It can be learned from the imaging apparatus 100 shown in FIG. 1 to FIG. 10 that, when there are a large quantity of signals, a correlation between transmitted signals may be reduced by changing one or more of a frequency, a transmission location, or a transmission direction of the signals, for example, a correlation between the first signal and the second signal is reduced, to correspondingly reduce correlation between received signals. In this way, a coding antenna-based signal fusion operation is performed based on a received signal, for example, the third signal and the fourth signal, to achieve high-quality imaging at high resolution.

Figure 10:
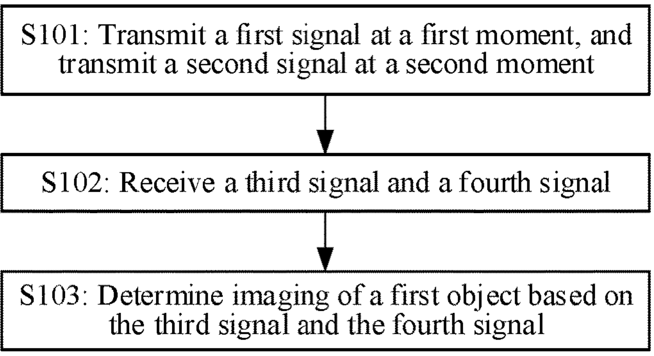
FIG. 10 is a schematic flowchart of an imaging method according to an embodiment of this application.

For example, FIG. 10 is a schematic flowchart of an imaging method according to an embodiment of this application. The imaging method may be applicable to the imaging apparatus shown in FIG. 1 to FIG. 9.

As shown in FIG. 10, the imaging method includes the following steps:

S101: Transmit a first signal at a first moment, and transmit a second signal at a second moment.

S102: Receive a third signal and a fourth signal.

S103: Determine imaging of a first object based on the third signal and the fourth signal.

For specific implementation of S101 to S103, refer to related descriptions of the imaging apparatus shown in FIG. 1 to FIG. 10. Details are not described herein again. In addition, for technical effects of the foregoing imaging method, refer to technical effects of the imaging apparatus shown in any one of FIG. 1 to FIG. 10. Details are not described herein again.

Figure 11:
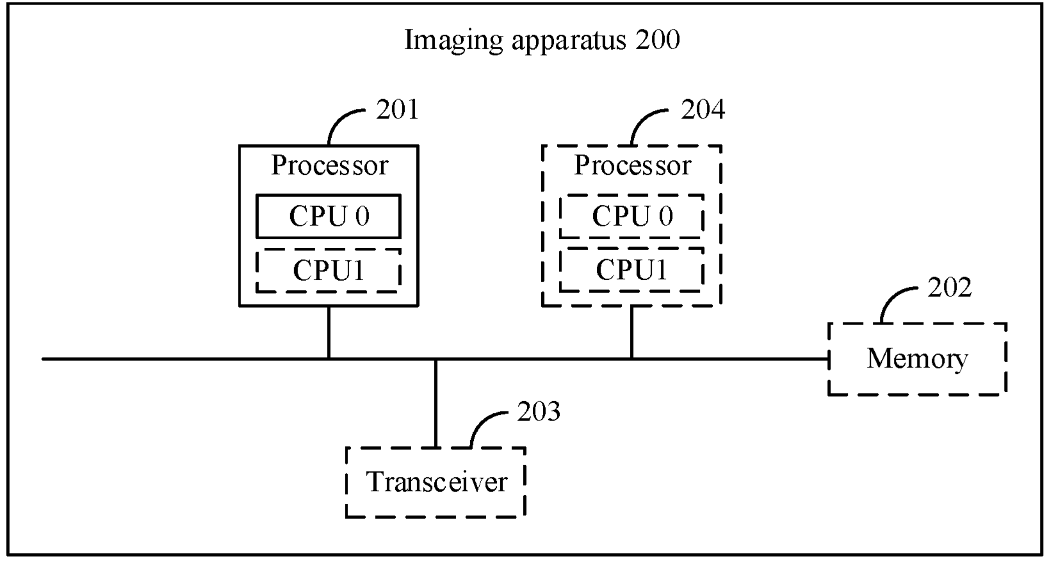
FIG. 11 is a schematic diagram 8 of a structure of an imaging apparatus according to an embodiment of this application.

For example, FIG. 11 is a schematic diagram 7 of a structure of an imaging apparatus according to an embodiment of this application. The imaging apparatus may be a terminal device, or may be a chip (system) or another component or assembly that may be disposed in the terminal device, or may be an apparatus or a system including the terminal device. As shown in FIG. 11, the imaging apparatus 200 may include a processor 201. Optionally, the imaging apparatus 200 may further include a memory 202 and/or a transceiver 203. The processor 201 is coupled to the memory 202 and the transceiver 203, for example, may be connected through a communication bus.

The following specifically describes each component of the imaging apparatus 200 with reference to FIG. 11.

The processor 201 is a control center of the imaging apparatus 200, and may be one processor, or may be a general term of a plurality of processing elements. For example, the processor 201 is one or more central processing units (CPUs), or may be an application-specific integrated circuit (ASIC), or is configured as one or more integrated circuits for implementing embodiments of this application, for example, one or more microprocessors (digital signal processors, DSPs) or one or more field programmable gate arrays (FPGA).

Optionally, the processor 201 may perform various functions of the imaging apparatus 200 by running or executing a software program stored in the memory 202 and invoking data stored in the memory 202.

During specific implementation, in an embodiment, the processor 201 may include one or more CPUs, for example, a CPU 0 and a CPU 1 shown in FIG. 11.

During specific implementation, in an embodiment, the imaging apparatus 200 may also include a plurality of processors, for example, the processor 201 and the processor 204 shown in FIG. 2. Each of the processors may be a single-core processor (single-CPU) or may be a multi-core processor (multi-CPU). The processor herein may be one or more devices, circuits, and/or processing cores configured to process data (for example, computer program instructions).

The memory 202 is configured to store a software program for executing the solutions of this application, and the processor 201 controls execution of the software program. For a specific implementation, refer to the foregoing method embodiment. Details are not described herein again.

The memory 202 may be a read-only memory (ROM), another type of static storage device that can store static information and instructions, a random access memory (RAM), or another type of dynamic storage device that can store information and instructions, or may be an electrically erasable programmable read-only memory (EEPROM), a compact disc read-only memory (CD-ROM) or other compact disc storage, optical disc storage (including a compact disc, a laser disc, an optical disc, a digital versatile disc, a Blu-ray disc, and the like), a magnetic disk storage medium or another magnetic storage device, or any other medium that can be configured to carry or store expected program code in a form of an instruction structure or a data structure and that can be accessed by a computer, but is not limited thereto. The memory 202 may be integrated with the processor 201, or may exist independently, and is coupled to the processor 201 through an interface circuit (not shown in FIG. 11) of the imaging apparatus 200. This is not specifically limited in this embodiment of this application.

The transceiver 203 is configured for communication with another communication apparatus. For example, the imaging apparatus 200 is a terminal device, and the transceiver 203 may be configured for communication with a network device, or communication with another terminal device. For another example, the imaging apparatus 200 is a network device, and the transceiver 203 may be configured for communication with a terminal device or communication with another network device.

Optionally, the transceiver 203 may include a receiver and a transmitter (not separately shown in FIG. 11). The receiver is configured to implement a receiving function, and the transmitter is configured to implement a transmitting function.

Optionally, the transceiver 203 may be integrated with the processor 201, or may exist independently, and is coupled to the processor 201 through an interface circuit (not shown in FIG. 11) of the imaging apparatus 200. This is not specifically limited in this embodiment of this application.

It should be noted that a structure of the imaging apparatus 200 shown in FIG. 11 does not constitute a limitation on the communication apparatus. An actual communication apparatus may include more or fewer components than those shown in the figure, or combine some components, or have different component arrangements.

In addition, for a technical effect of the imaging apparatus 200, refer to the technical effect of the communication method in the foregoing method embodiment. Details are not described herein again.

An embodiment of this application provides a communication system. The communication system includes the foregoing one or more terminal devices and one or more network devices.

It should be understood that, the processor in embodiments of this application may be a central processing unit (CPU), or may be another general-purpose processor, a digital signal processor (DSP), an application-specific integrated circuit (application specific integrated circuit, ASIC), a field programmable gate array (FPGA), or another programmable logic device, a discrete gate or transistor logic device, a discrete hardware component, or the like. The general purpose processor may be a microprocessor, or the processor may be any conventional processor or the like.

It may be further understood that the memory in embodiments of this application may be a volatile memory or a nonvolatile memory, or may include a volatile memory and a nonvolatile memory. The nonvolatile memory may be a read-only memory (ROM), a programmable read-only memory (PROM), an erasable programmable read-only memory (EPROM), an electrically erasable programmable read-only memory (EEPROM), or a flash memory. The volatile memory may be a random access memory (RAM), and is used as an external cache. Through example but not limitative description, many forms of random access memories may be used, for example, a static random access memory (SRAM), a dynamic random access memory (DRAM), a synchronous dynamic random access memory (SDRAM), a double data rate synchronous dynamic random access memory (DDR SDRAM), an enhanced synchronous dynamic random access memory (ESDRAM), a synchronous link dynamic random access memory (SLDRAM), and a direct rambus dynamic random access memory (DR RAM).

All or some of the foregoing embodiments may be implemented by using software, hardware (such as a circuit), firmware, or any combination thereof. When software is used to implement embodiments, all or some of the foregoing embodiments may be implemented in a form of a computer program product. The computer program product includes one or more computer instructions or computer programs. When the computer instructions or the computer programs are loaded or executed on a computer, the procedure or functions according to embodiments of this application are all or partially generated. The computer may be a general-purpose computer, a dedicated computer, a computer network, or other programmable apparatuses. The computer instructions may be stored on a computer-readable storage medium, or transmitted from one computer-readable storage medium to another computer-readable storage medium. For example, the computer instructions may be transmitted from a website, computer, server, or data center to another website, computer, server, or data center in a wired (for example, infrared, radio, or microwave) manner. The computer-readable storage medium may be any usable medium accessible to a computer, or a data storage device, such as a server or a data center, integrating one or more usable media. The usable medium may be a magnetic medium (for example, a floppy disk, a hard disk, or a magnetic tape), an optical medium (for example, DVD), a semiconductor medium, or the like. The semiconductor medium may be a solid state drive.

It should be understood that the term "and/or" in this specification describes only an association relationship between associated objects and indicates that three relationships may exist. For example, A and/or B may represent the following three cases: Only A exists, both A and B exist, and only B exists. A and B may be singular or plural. In addition, the character "/" in this specification usually indicates an "or" relationship between the associated objects, but may also indicate an "and/or" relationship. For details, refer to the context for understanding.

In this application, at least one means one or more, and a plurality of means two or more. At least one of the following items (pieces) or a similar expression thereof refers to any combination of these items, including any combination of singular items (pieces) or plural items (pieces). For example, at least one of a, b, or c may indicate: a, b, c, a-b, a-c, b-c, or a-b-c, where a, b, and c may be singular or plural.

It should be understood that sequence numbers of the foregoing processes do not mean execution sequences in various embodiments of this application. The execution sequences of the processes should be determined based on functions and internal logic of the processes, and should not be construed as any limitation on the implementation processes of embodiments of this application.

A person of ordinary skill in the art may be aware that, in combination with the examples described in embodiments disclosed in this specification, units and algorithm steps can be implemented by electronic hardware or a combination of computer software and electronic hardware. Whether the functions are performed by hardware or software depends on particular applications and design constraints of the technical solutions. A person skilled in the art may use different methods to implement the described functions of each particular application, but it should not be considered that the implementation goes beyond the scope of this application.

It may be clearly understood by a person skilled in the art that, for convenient and brief description, for a detailed working process of the foregoing system, apparatus, and units, refer to a corresponding process in the foregoing method embodiments, and details are not described herein again.

In the several embodiments provided in this application, it should be understood that the disclosed systems, apparatuses, and methods may be implemented in other manners. For example, the described apparatus embodiment is merely an example. For example, division into the units is merely logical function division and may be other division during actual implementation. For example, a plurality of units or components may be combined or integrated into another system, or some features may be ignored or not performed. In addition, the displayed or discussed mutual couplings or direct couplings or communication connections may be implemented through some interfaces. The indirect couplings or communication connections between the apparatuses or units may be implemented in electronic, mechanical, or other forms.

The units described as separate parts may or may not be physically separate, and parts displayed as units may or may not be physical units, may be located in one position, or may be distributed on a plurality of network units. Some or all of the units may be selected based on actual requirements to achieve the objectives of the solutions of embodiments.

In addition, functional units in embodiments of this application may be integrated into one processing unit, each of the units may exist alone physically, or two or more units are integrated into one unit.

When the functions are implemented in the form of a software functional unit and sold or used as an independent product, the functions may be stored in a computer-readable storage medium. Based on such an understanding, the technical solutions of this application essentially, or the part contributing to the conventional technology, or some of the technical solutions may be implemented in a form of a software product. The software product is stored in a storage medium, and includes several instructions for instructing a computer device (which may be a personal computer, a server, or a network device) to perform all or some of the steps of the methods described in embodiments of this application. The foregoing storage medium includes any medium that can store program code, for example, a USB flash drive, a removable hard disk, a read-only memory (ROM), a random access memory (RAM), a magnetic disk, or an optical disc.

The foregoing descriptions are merely specific implementations of this application, but are not intended to limit the protection scope of this application. Any variation or replacement readily figured out by a person skilled in the art within the technical scope disclosed in this application shall fall within the protection scope of this application. Therefore, the protection scope of this application shall be subject to the protection scope of the claims.

What is claimed is:

1. An imaging method, comprising:

transmitting a first signal at a first moment in time, and transmitting a second signal at a second moment in time, wherein the first moment in time is different from the second moment in time, and the first signal and the second signal are different in one or more of the following: a frequency, a transmission location, or a transmission direction;

receiving a third signal and a fourth signal, wherein the third signal is a signal obtained by reflecting the first signal via a first object, and the fourth signal is a signal obtained by reflecting the second signal via the first object; and determining an image of the first object based on the third signal and the fourth signal.

2. The imaging method according to claim 1, wherein:

the first signal is transmitted in a first area of an antenna array;

the second signal is transmitted in a second area of the antenna array;

the first area is different from the second area;

no signal is transmitted in the second area at the first moment in time; and no signal is transmitted in the first area at the second moment in time.

3. The imaging method according to claim 1, wherein:

the first signal is transmitted in response to an antenna array being located at a first location;

the second signal is a signal transmitted in response to the antenna array being located at a second location;

and the first location is different from the second location.

4. The imaging method according to claim 1, wherein:

the first signal is a signal transmitted in response to an antenna array being in a first posture;

the second signal is a signal transmitted in response to the antenna array being in a second posture; and the first posture is different from the second posture.

5. The imaging method according to claim 1, wherein:

a frequency difference between the first signal and the second signal is greater than a first frequency conversion threshold;

the frequency difference between the first signal and the second signal is less than a second frequency conversion threshold; and the first frequency conversion threshold is less than the second frequency conversion threshold.

6. The imaging method according to claim 5, wherein:

a frequency of the first signal corresponds to a phase or an amplitude of the first signal; and a frequency of the second signal corresponds to a phase or an amplitude of the second signal.

7. The imaging method according to claim 5, wherein:

the second moment in time is after the first moment in time; and a phase or an amplitude of the second signal is determined based on a frequency, a phase, and an amplitude of the first signal.

8. An imaging apparatus, comprising:

a transceiver configured to:

transmit a first signal at a first moment in time, transmit a second signal at a second moment in time, and receive a third signal and a fourth signal, wherein the first moment in time is different from the second moment in time, the first signal and the second signal are different in one or more of the following: a frequency, a transmission location, or a transmission direction, the third signal is a signal obtained by reflecting the first signal via a first object, and the fourth signal is a signal obtained by reflecting the second signal via the first object; and a processor configured to determine an image of the first object based on the third signal and the fourth signal.

9. The imaging apparatus according to claim 8, wherein:

the first signal is a signal transmitted in a first area of an antenna array;

the second signal is a signal transmitted in a second area of the antenna array;

the first area is different from the second area;

no signal is transmitted in the second area at the first moment in time; and no signal is transmitted in the first area at the second moment in time.

10. The imaging apparatus according to claim 8, wherein:

the first signal is a signal transmitted in response to an antenna array being located at a first location;

the second signal is a signal transmitted in response to the antenna array being located at a second location; and the first location is different from the second location.

11. The imaging apparatus according to claim 8, wherein:

the first signal is a signal transmitted in response to an antenna array being in a first posture;

the second signal is a signal transmitted in response to the antenna array being in a second posture; and the first posture is different from the second posture.

12. The imaging apparatus according to claim 8, wherein:

a frequency difference between the first signal and the second signal is greater than a first frequency conversion threshold;

the frequency difference between the first signal and the second signal is less than a second frequency conversion threshold; and the first frequency conversion threshold is less than the second frequency conversion threshold.

13. The imaging apparatus according to claim 12, wherein:

a frequency of the first signal corresponds to a phase or an amplitude of the first signal; and a frequency of the second signal corresponds to a phase or an amplitude of the second signal.

14. The imaging apparatus according to claim 12, wherein the second moment in time is after the first moment in time; and a phase or an amplitude of the second signal is determined based on a frequency, a phase, and an amplitude of the first signal.

15. A non-transitory computer-readable storage medium with instructions stored thereon, wherein when the instructions are executed by an imaging apparatus, the imaging apparatus is enabled to perform operations including:

transmitting a first signal at a first moment in time, and transmitting a second signal at a second moment in time, wherein the first moment in time is different from the second moment in time, and the first signal and the second signal are different in one or more of the following: a frequency, a transmission location, or a transmission direction;

receiving a third signal and a fourth signal, wherein the third signal is a signal obtained by reflecting the first signal via a first object, and the fourth signal is a signal obtained by reflecting the second signal via the first object; and determining an image of the first object based on the third signal and the fourth signal.

16. The non-transitory computer-readable storage medium according to claim 15, wherein:

the first signal is a signal transmitted in a first area of an antenna array;

the second signal is a signal transmitted in a second area of the antenna array;

the first area is different from the second area;

no signal is transmitted in the second area at the first moment in time; and no signal is transmitted in the first area at the second moment in time.

17. The non-transitory computer-readable storage medium according to claim 15, wherein:

the first signal is a signal transmitted in response to an antenna array being located at a first location;

the second signal is a signal transmitted in response to the antenna array being located at a second location;

and the first location is different from the second location.

18. The non-transitory computer-readable storage medium according to claim 15, wherein:

the first signal is a signal transmitted in response to an antenna array being in a first posture;

the second signal is a signal transmitted in response to the antenna array being in a second posture; and the first posture is different from the second posture.

19. The non-transitory computer-readable storage medium according to claim 15, wherein:

a frequency difference between the first signal and the second signal is greater than a first frequency conversion threshold;

the frequency difference between the first signal and the second signal is less than a second frequency conversion threshold; and the first frequency conversion threshold is less than the second frequency conversion threshold.

20. The imaging method according to claim 1, wherein determining the image of the first object comprises determining a scattering coefficient of each of a plurality of sub-areas in an area in which the first object is located based on the third signal and the fourth signal.

* * * * *